United States Patent
Kao et al.

(10) Patent No.: US 7,529,406 B2
(45) Date of Patent: May 5, 2009

(54) HIGH SPEED AND HIGH ACCURACY IMAGE ADJUSTING APPARATUS AND METHOD THEREOF

(75) Inventors: Hsu-Chia Kao, Pingjen (TW); Hsu-Pin Kao, Pingjen (TW); Chun-Yen Yang, Taipei (TW); Hsuan-Ku Chu, Kaohsiung Shien (TW)

(73) Assignee: Quanta Computer Inc. (TW)

( * ) Notice: Subject to any disclaimer, the term of this patent is extended or adjusted under 35 U.S.C. 154(b) by 686 days.

(21) Appl. No.: 11/099,045

(22) Filed: Apr. 5, 2005

(65) Prior Publication Data

US 2005/0249410 A1    Nov. 10, 2005

(30) Foreign Application Priority Data

May 7, 2004    (TW)    ............................. 93113008 A

(51) Int. Cl.
G06K 9/00    (2006.01)
H04N 5/14    (2006.01)
G03F 3/08    (2006.01)
(52) U.S. Cl. ..................... 382/169; 348/672; 358/522
(58) Field of Classification Search ................. 382/169, 382/168; 348/671, 672, 673; 358/522, 523; 702/180
See application file for complete search history.

(56) References Cited

U.S. PATENT DOCUMENTS

| | | | | |
|---|---|---|---|---|
| 4,792,979 A | * | 12/1988 | Nomura et al. | 382/169 |
| 4,907,288 A | * | 3/1990 | Shimoni | 382/169 |
| 4,924,323 A | * | 5/1990 | Numakura et al. | 382/169 |
| 5,544,258 A | * | 8/1996 | Levien | 382/169 |
| 5,790,707 A | * | 8/1998 | Tanaka et al. | 382/274 |
| 5,982,449 A | * | 11/1999 | Nagai et al. | 348/671 |
| 6,373,533 B1 | * | 4/2002 | Kawabata et al. | 348/671 |

(Continued)

FOREIGN PATENT DOCUMENTS

CN    1469634    1/2004

(Continued)

OTHER PUBLICATIONS

Zimmerman et al., 'An Evaluation of Effectiveness of Adaptive Histogram Equalization for Contrast Enhancement', Dec. 1988, IEEE Transactions on Medical Imaging, vol. 7, No. 4, pp. 304-312.*

(Continued)

Primary Examiner—Aaron W Carter
(74) Attorney, Agent, or Firm—Hoffman Warnick LLC

(57) ABSTRACT

The invention provides an image adjusting apparatus for receiving a set of input signals transmitted from a video interface, which is used for receiving a plurality of sets of input signals. The image adjusting apparatus is further used for automatically adjusting the set of input signals to generate a set of output signals. The image adjusting apparatus includes an operation module, a storage module, an offset module and a gain module. The operation module receives a test image to generate a plurality of adjusting signals. The storage module stores the adjusting signals. The offset module transforms, according to the adjusting signals, the set of input signals into a set of temporary signals. Moreover, the gain module transforms, according to the plurality of adjusting signals, the set of temporary signals into the set of output signals.

13 Claims, 9 Drawing Sheets

U.S. PATENT DOCUMENTS

| | | |
|---|---|---|
| 6,414,659 B1 | 7/2002 | Park et al. |
| 6,700,628 B1 * | 3/2004 | Kim .......................... 348/671 |
| 6,950,114 B2 * | 9/2005 | Honda et al. ................ 348/671 |

FOREIGN PATENT DOCUMENTS

| | | | |
|---|---|---|---|
| EP | 352491 A1 * | 1/1990 | |
| EP | 501728 A2 * | 9/1992 | |
| EP | 1313328 A2 | 5/2003 | |
| EP | 1475745 A1 | 11/2004 | |
| JP | 63285680 | 11/1988 | |
| JP | 2003158668 | 5/2003 | |
| JP | 2003234901 | 8/2003 | |
| WO | 0169531 A1 | 9/2001 | |

OTHER PUBLICATIONS

Wang et al., 'Image Enhancement Based on Equal Area Dualistic Sub-Image Histogram Equalization Method', Feb. 1999, IEEE Transactions on Consumer Electronics, vol. 45, No. 1, pp. 68-75.*

* cited by examiner

HIGH SPEED AND HIGH ACCURACY IMAGE ADJUSTING APPARATUS AND METHOD THEREOF

FIELD OF THE INVENTION

The present invention relates to an image adjusting apparatus and method thereof, and more particularly, to an image adjustment apparatus and method with high speed and high accuracy.

DESCRIPTION OF THE PRIOR ART

The conventional video interface affords to receive multiple types of image signals, such as a digital YCbCr signal, a digital RGB signal, an analog YPbPr signal, an analog RGB signal, an analog S-video signal, an analog composite video signal, and so on. Each type of image signals needs different decoders, and hence the circuits they transmitted are different. This situation causes the variation of the offset value and the gain value of the image signals when showing the standard image.

Except the difference of the circuit, the difference of the circuit board also causes the variation of the signals. Referring to FIG. 1, FIG. 1 is a schematic diagram illustrating the histogram of gray level of the signals transformed from YCbCr to RGB color space in the conventional art. The monitor displays the image in RGB type, and the signals have to be changed to the RGB type. The histogram often is used to illustrate the character of the image, the horizontal axis of it represents the gray level of the image, the vertical axis of it represents the pixel number of the corresponding gray level, and the area of it represents the total pixel number of the image. Therefore, the histogram shows the gray level distribution of the whole image.

As shown in FIG. 1, the three lines respectively represent the image characters of the corresponding Red, Green, and Blue. The correct distribution range of the gray level is from 0 to 255. In practice, the range of the gray level is from 16 to 235 because of the offset departure and the gain departure caused by the signals transformation.

There are some reasons following, which cause the offset departure and the gain departure so as to bring about the incorrect distribution range of the gray level: (1) different signal type, (2) image procession, (3) difference signal circuit, and (4) difference electronic component. These reasons cause the color and the contrast departure of the image to influence the quality of the image.

The prior art spends a lot of time and labor power to adjust the image, and the quality of adjustment is hard to control. Therefore the prior art is hard to have mass production. Accordingly, an objective of the invention is to modify the exceeding brightness of the lowest gray level, and to increase the display gray levels of the display device.

SUMMARY OF THE INVENTION

The objective of the invention is to provide an image adjusting apparatus and method thereof, and particularly, the image adjusting apparatus and method according to the invention has higher processing rate and accuracy.

According to the invention, the image adjusting apparatus is used for receiving a set of input signals transmitted from a video interface, which is used for receiving a plurality of sets of input signals. The image adjusting apparatus is further used for automatically adjusting the set of input signals to generate a set of output signals.

The image adjusting apparatus includes an operation module, a storage module, an offset module and a gain module. The operation module is used for receiving a test image to generate a plurality of adjusting signals. The storage module is used for storing the plurality of adjusting signals. The offset module is used for transforming the set of input signals into a set of temporary signal in accordance with the plurality of adjusting signals. The gain module is used for transforming the set of temporary signals into the set of output signals in accordance with the plurality of adjusting signals.

Therefore, the image adjusting apparatus and the method thereof utilizes the design circuits, the test image, and co-operated computations to confirm the gray level of the image. Furthermore, each of the circuits is repeatedly adjusted by computer control during a second to confirm the gray level directly.

Comparing with the prior art, the image adjusting apparatus and the method thereof according to the invention is more accurate and swifter, so as to improve the speed and the accuracy of the image adjustment.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
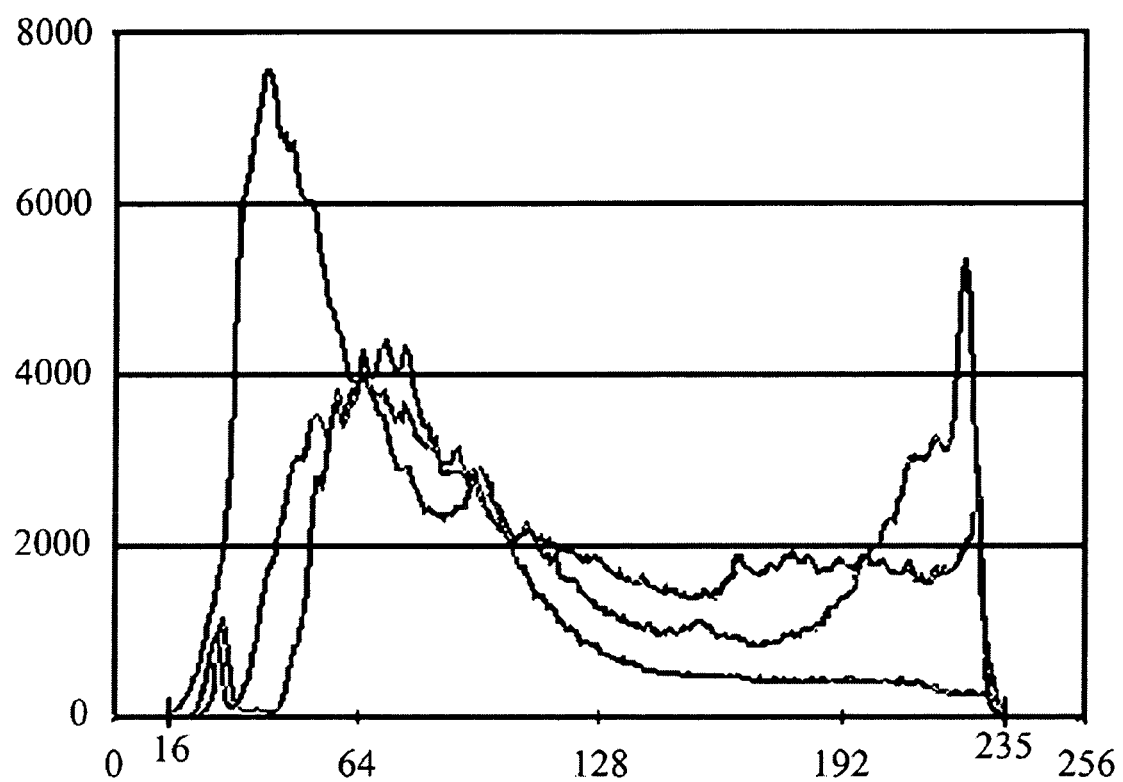
FIG. 1 is a schematic diagram illustrating the histogram of the gray level of the signals transformed from YCbCr to RGB color space in the conventional art.
Figure 2:
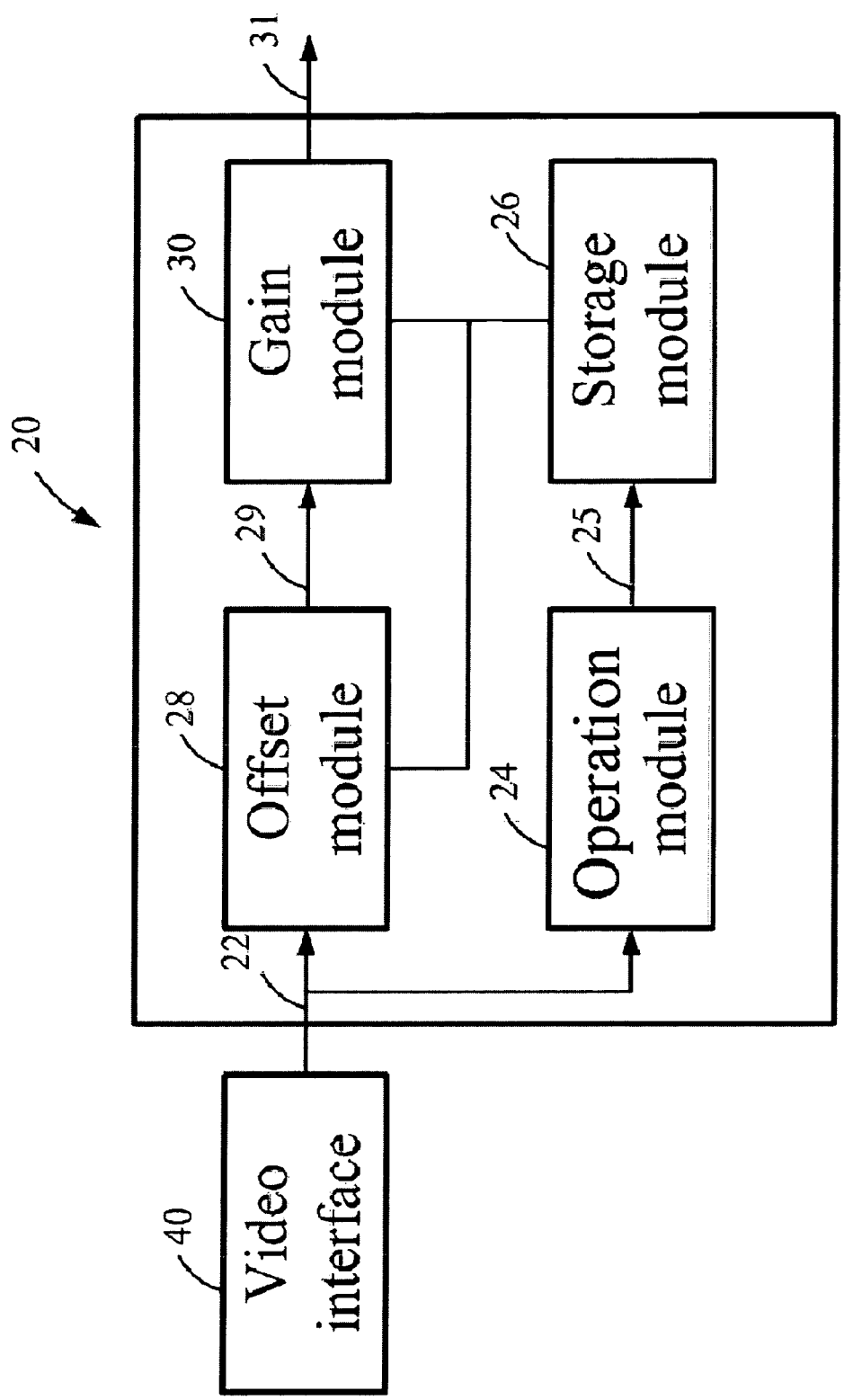
FIG. 2 is a functional block diagram illustrating an image adjusting apparatus according to the invention.

Referring to FIG. 2, FIG. 2 is a functional block diagram illustrating an image adjusting apparatus 20 according to the invention. The image adjusting apparatus 20 is used for receiving a set of input signals 22 transmitted from a video interface 40, which is used to receive a plurality of sets of input signals. The image adjusting apparatus 20 is further used for automatically adjusting the set of input signals 22 to generate a set of output signals 31. The image adjusting apparatus 20 includes an operation module 24, a storage module 26, an offset module 28 and a gain module 30.

The operation module 24 is used for receiving a test image (not shown) included in the input signals 22, for transforming the test image into a histogram, and for generating a plurality of adjusting signals 25 in accordance with the gray level distribution of the histogram. The plurality of adjusting signals 25 include a plurality of offset signals and a plurality of gain signals.

In an embodiment, an image generator controlled by a controller generates the test image of the invention.

Figure 3:
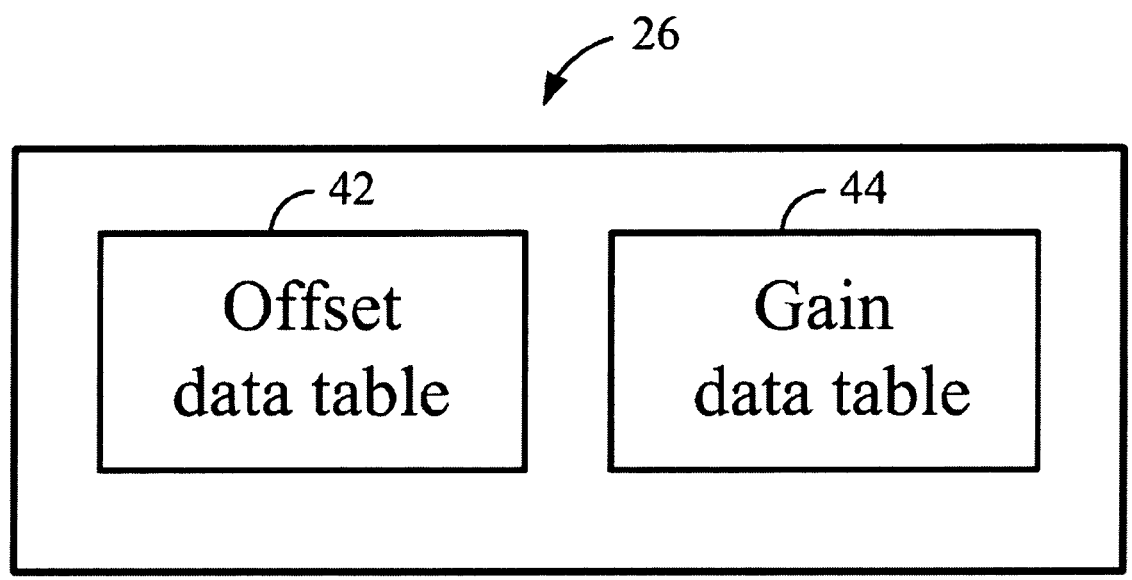
FIG. 3 is a schematic diagram illustrating a storage module of an image adjusting apparatus according to the invention.

Referring to FIG. 3, FIG. 3 is a schematic diagram illustrating a storage module 26 of an image adjusting apparatus 20 shown in FIG. 2. The storage module 26 is used for storing the plurality of adjusting signals 25. The storage module 26 includes an offset data table 42 and a gain data table 44. The offset data table 42 is used for storing the plurality of offset signals, and the gain data table 44 is used for storing the plurality of gain signals. The offset signals recorded in the offset data table 42 are the offset values, and the gain signals recorded in the gain data table 44 are the gain values.

Referring to FIG. 2 and FIG. 3, the offset module 28 is connected to the offset data table 42 and transforms the set of input signals 22 into a set of temporary signal 29, according to the plurality of offset signals included in the adjusting signals 25.

The gain module 30 is connected to the gain data table 44, and transforms the set of temporary signals 29 into the set of output signals 31 in accordance with the plurality of gain signals included in the plurality of adjusting signals 25.

Figure 4A:
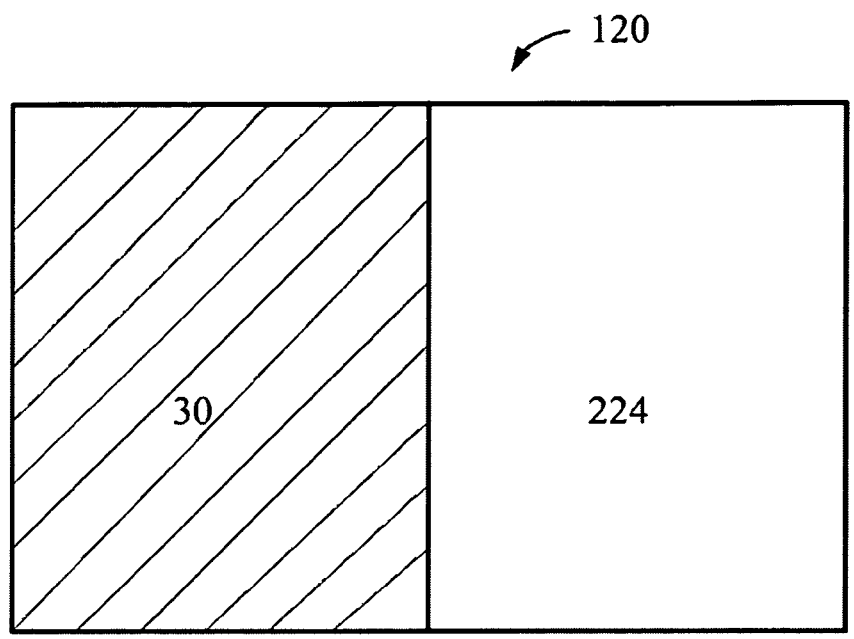
FIG. 4A is a test image included in the input signals.
Figure 4B:
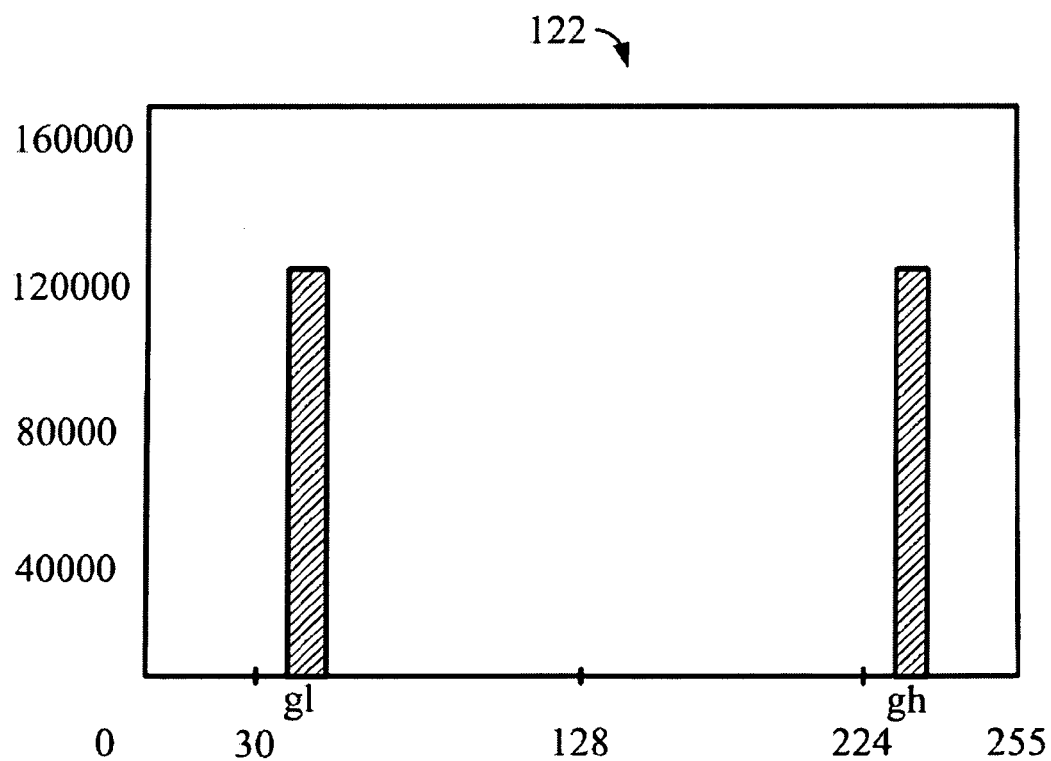
FIG. 4B is a histogram corresponding to the test image shown in FIG. 4A.

Referring to FIGS. 4A and 4B, FIG. 4A is a test image 120 included in the input signals 22 shown in FIG. 2, and FIG. 4B is a histogram 122 corresponding to the test image 120 shown in FIG. 4A. Thereinafter the operation module 24 would be described in detail. As shown in FIG. 4A, the input signals 22 include the test image 120. The test image 120 is separated into an image of gray level Gl and another image of gray level Gh. Gl and Gh can be known according to the type of the input signals 22, and each type of the input signals 22, such as digital YCbCr signals, digital RGB signals, analog YPbPr signals, analog RGB signals, analog S-Video signals, analog composite video signals, have the corresponding value of Gl and Gh. Therefore the Gl and Gh are given.

In the embodiment shown in FIG. 4A, the input signals 22 are the YCbCr signals, and the gray levels of the test image 120 are given, where the Gl=30, Gh=224. As shown in FIG. 4B, the image is inputted by the video interface 40, and calculated by the operation module 24 to generate the corresponding histogram 122. The originally gray level of 30 of an image is changed into gl after transmitting by the video interface 40, and the originally gray level of 224 of an image is changed into gh after transmitting in the video interface 40. An offset value and a gain value are defined and calculated as following:

Offset1=Gl  Formula 1

Offset2=gl  Formula 2

$$\text{Formula 3: Gain} = \frac{Gh - Gl}{gh - gl}$$

The offset value and the gain value of the circuit can be gotten by the three formulas, and the image is adjusted accurately by the following formula 4. In formula 4, Offset3=Offset2−Offset1.

$$\text{Formula 4: Gray Level'} = \left[\text{Gray Level} - \textit{Offset3} - Gl\left(1 - \frac{1}{\text{Gain}}\right)\right] \times \text{Gain}$$

The test image in FIG. 4A is inputted the video interface 40 by different circuit, and outputted in digital RGB type. The operation module 24 calculates the offset value and the gain value of each circuit according to formula 1, formula 2 and formula 3, and then stores these values in the offset data table 42 and the gain data table 44, respectively. Afterward, the image outputted by different circuit of the video interface 40 is calculated by formula 4 and then transmitted to a monitor, and therefore, the monitor can display the image with excellent quality.

Figure 5:
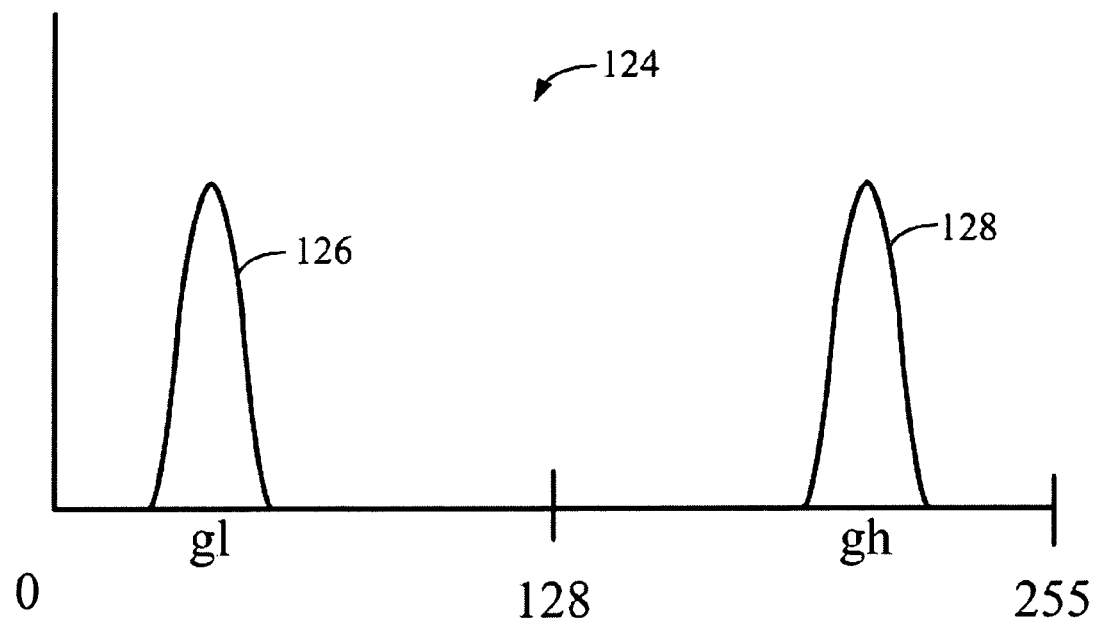
FIG. 5 is a schematic diagram illustrating a realistic histogram.

Referring to FIGS. 4A, 4B and 5, FIG. 5 is a schematic diagram illustrating a realistic histogram 124 of the test image 120 shown in FIG. 4A. In reality, due to affects of the characteristics of analog devices, the layout of circuits and noises, the histogram, generated by the offset module 28 and the gain module 30 in accordance with the test image shown in FIG. 4A, is as shown in FIG. 5, but not as simply as shown in FIG. 4B. FIG. 4B is just a sketch based on the need to describe the aforesaid explanation. In other words, in reality, the gray levels in the histogram are distributed in a specific region.

As shown in FIG. 5, in the embodiment the histogram 124 separates the image into two parts, one is the darker gray level 126, and the other is the brighter gray level 128. For reasonably defining the gl and gh, the area of the histogram is calculated to determine the gl and gh.

Figure 6:
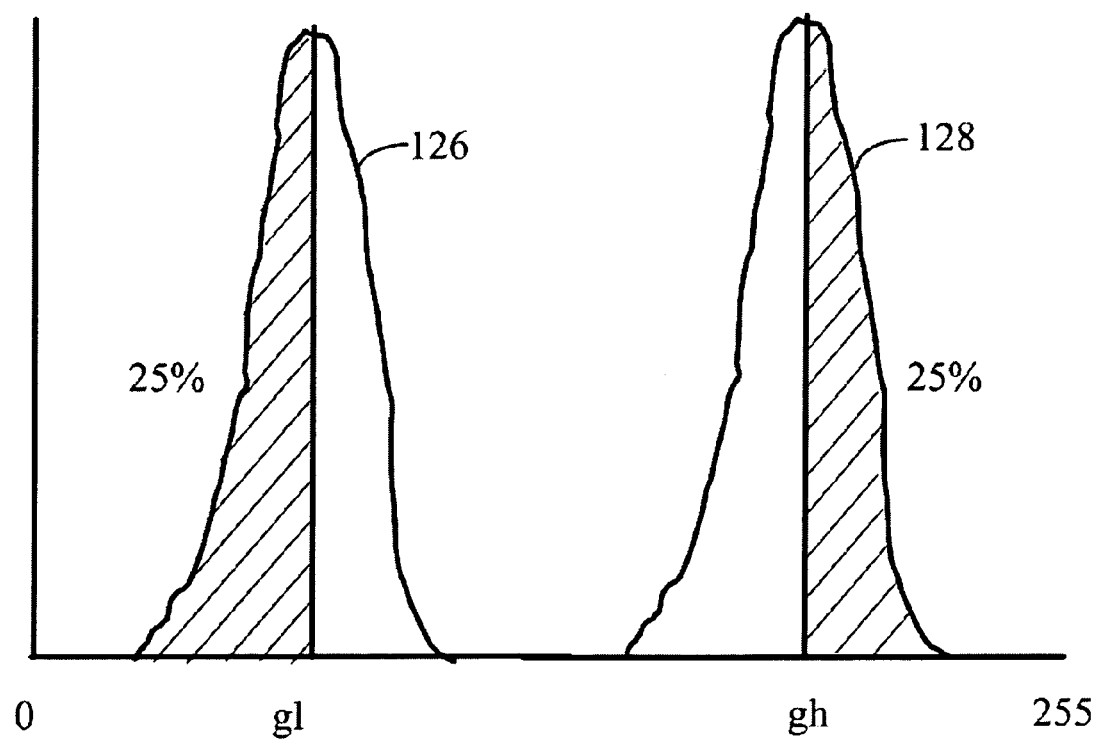
FIG. 6 is a schematic diagram illustrating the gray level judged by a histogram according to the invention.

Referring to FIGS. 5 and 6, FIG. 6 is a schematic diagram illustrating the gray level judged by a histogram 124 according to the invention. As shown in FIG. 5, in the histogram 124, the image is separated into two parts: the darker gray level 126 and the brighter gray level 128. As shown in FIG. 6, the gl value equals to the left 25% area of the histogram 124, and the gh value equals to the right 25% area of the histogram 124.

In other embodiment, the gray level can be determined in different way, such as utilizing the mean value of all the gray level or the weighted averages method.

To increase the accuracy of image adjustment, the offset value stored in the offset data table 42 is a mean value of all the offset value determined in different time, and the gain value stored in the gain data table 44 is a mean value of all the gain value determined in different time. In an embodiment, the way to calculate a mean value of 16 results determined in different time is as following formula 5 and formula 6:

$$\text{Formula 5: Offset} = \frac{1}{16}\sum_{t=0}^{15} \textit{Offset}_t$$

$$\text{Formula 6: Gain} = \frac{1}{16}\sum_{t=1}^{15} \textit{Gain}_t$$

Figure 7:
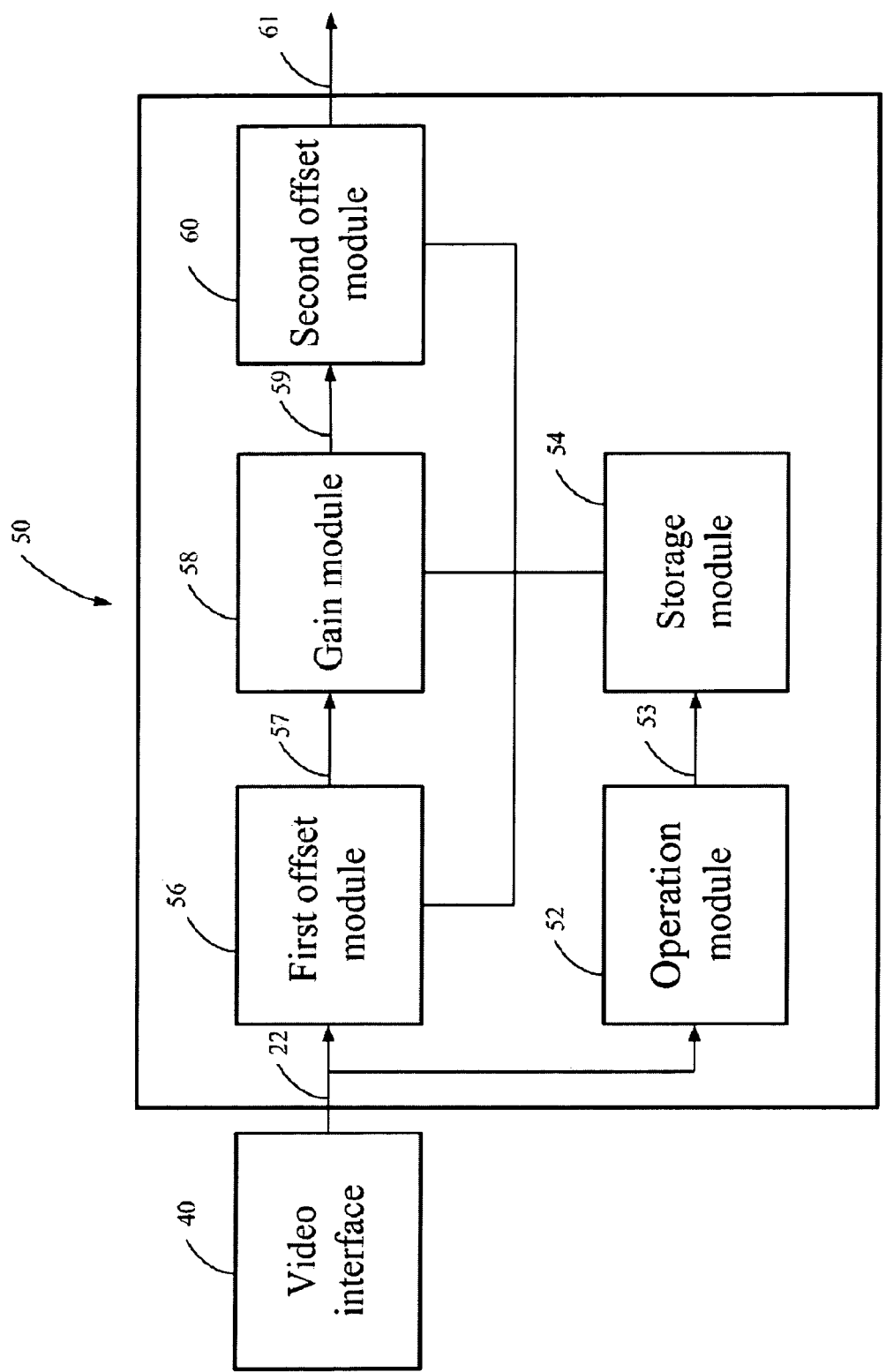
FIG. 7 is a schematic diagram illustrating an image adjusting apparatus according to an embodiment of the invention.
Figure 8:
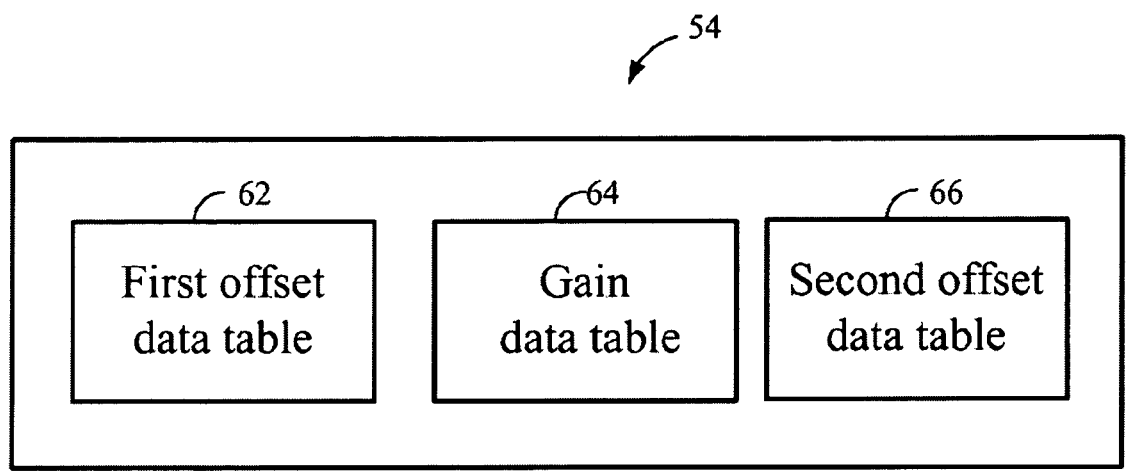
FIG. 8 is a schematic diagram illustrating a storage module of an image adjusting apparatus according to an embodiment of the invention.

Referring to FIGS. 7 and 8, FIG. 7 is a schematic diagram illustrating an image adjusting apparatus 50 according to an embodiment of the invention, and FIG. 8 is a schematic diagram illustrating a storage module 54 of the image adjusting apparatus 50 according to an embodiment of the invention shown in FIG. 7. In an embodiment, the image adjusting apparatus 50 is used for receiving a set of input signals 22 transmitted from a video interface 40, which is used to receive a plurality of sets of input signals. The image adjusting apparatus 50 is further used for automatically adjusting the set of input signals 22 to generate a set of output signals 61. The image adjusting apparatus 50 includes an operation module 52, a storage module 54, a first offset module 56, a gain module 58 and a second offset module 60.

The operation module 52 is used for receiving a test image, transforming the test image into an histogram, and generating a plurality of adjusting signals 53 in accordance with the gray level distribution of the histogram. The plurality of adjusting signals 53 include a plurality of first offset signals, a plurality of second offset signals and a plurality of gain signals.

The offset value and the gain value of the circuit can be gotten by the three formulas 1 to 3, and the image is adjusted accurately by the following formula 7.

Gray Level'=(Gray Level−Offset2)×Gain+Offset1    Formula 7

As shown in FIG. 8, the storage module 54 is used for storing the plurality of adjusting signals 53. The storage module 54 includes the first offset data table 62, a second offset data table 66 and a gain data table 64. The first offset data table 62 is used for storing the plurality of first offset signals, the second offset data table 66 is used for storing the plurality of second offset signals, and the gain data table 64 is used for storing the plurality of gain signals. Offset2 represents the data recorded in the first offset data table 62, Offset1 represents the data recorded in the second offset data table 66, and Gain represents the gain signals recorded in the gain data table 64.

The first offset module 56 is connected to the first offset data table 62, and transforms the set of input signals 22 into a set of first temporary signal 57 in accordance with the plurality of first offset signals. The gain module 58 is connected to the gain data table 64, and transforms the set of first temporary signals 57 into the set of second temporary signals 59 in accordance with the plurality of gain signals. The second offset module 60 is connected to the second offset data table 66, and transforms the set of second temporary signals 59 into the set of output signals 61 in accordance with the plurality of second offset signals.

The image adjusting apparatus 50 shown in FIG. 7 utilizes more offset modules and more offset data tables than those utilized by the image adjusting apparatus 20 shown in FIG. 2. Although the image adjusting apparatus 50 needs more devices and spends more adjusting time, the image adjusting apparatus 50 has higher accuracy than the image adjusting apparatus 20.

Figure 9:
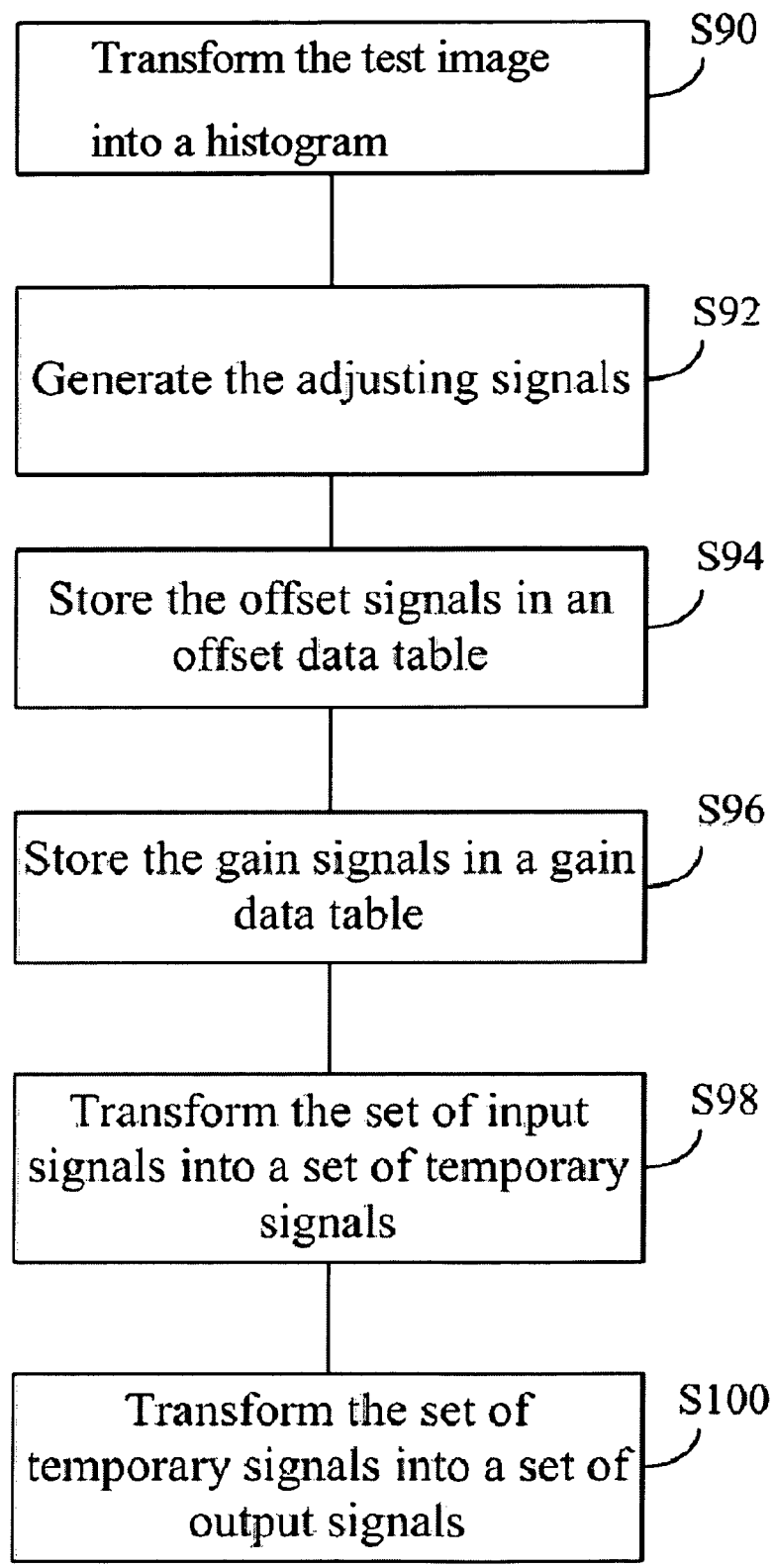
FIG. 9 is a flowchart illustrating the method for adjusting the image according to the invention.

Referring to FIG. 9, FIG. 9 is a flowchart illustrating the method for adjusting the image according to the invention. An image adjusting method of the invention is used for receiving a set of input signals transmitted from a video interface, which is used for receiving a plurality of sets of input signals. The image adjusting method is further used for automatically adjusting the set of input signals to generate a set of output signals.

At start, step S90 is performed to transform the test image into a histogram in a predetermined manner. Afterwards, step S92 is performed. In step S92, the plurality of adjusting signals is generated according to the gray level distribution of the histogram. Step S94 is then performed. In step S94, a plurality of offset signals is stored in an offset data table. Step S96 is then performed. In step S96, a plurality of gain signals is stored in a gain data table. Afterwards, step S98 is performed. In step S98, the set of input signals is transformed into a set of temporary signals according to the plurality of offset signals. Step S100 is then performed. In step S100, the set of temporary signals is transformed into a set of output signals in accordance with the plurality of gain signals.

Figure 10:
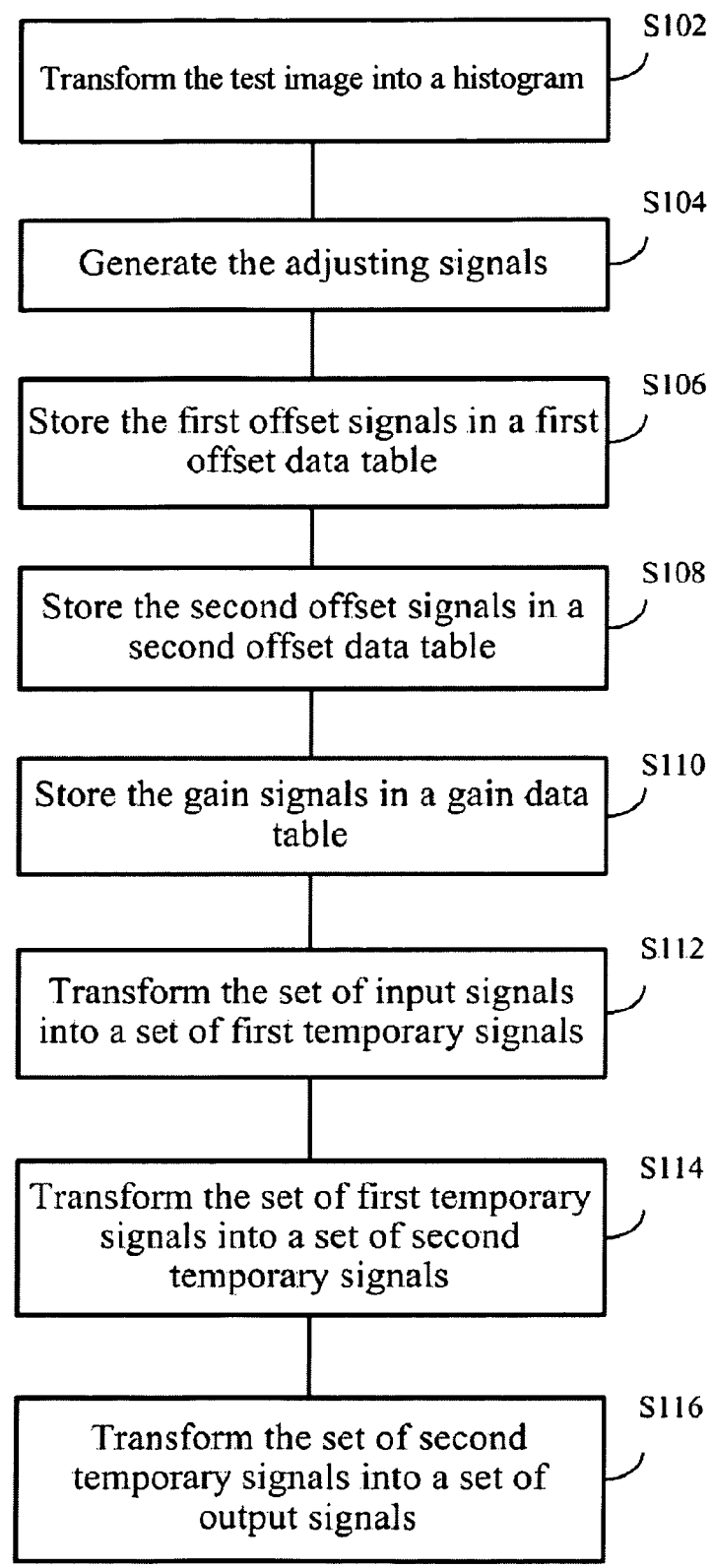
FIG. 10 is a flowchart illustrating the method for adjusting the image according to an embodiment of the invention.

Referring to FIG. 10, FIG. 10 is a flowchart illustrating the method for adjusting the image according to another embodiment of the invention. At start, step S102 is performed to transform the test image into a histogram in another predetermined manner. Afterwards, step S104 is performed. In step S104, the plurality of adjusting signals is generated according to the gray level distribution of the histogram, and the plurality of adjusting signals include a plurality of first offset signals, a plurality of second offset signals and a plurality of gain signals. Step S106 and step S108 are then performed. In step S106, a plurality of first offset signals is stored in a first offset data table. In step S108, a plurality of second offset signals is stored in a second offset data table. Step S110 is then performed. In step S9110, a plurality of gain signals is stored in a gain data table. Afterwards, step S112 is performed. In step S112, the set of input signals is transformed into a set of first temporary signals in accordance with the plurality of first offset signals. Step S114 is then performed. In step S114, the set of first temporary signals are transformed into a set of second temporary signals in accordance with the plurality of gain signals. Step S116 is then performed. In step S116, the set of second temporary signals are transformed into a set of output signals in accordance with the plurality of second offset signals.

An image adjusting apparatus of the invention calculates the image by an operation module, and records the adjusted parameters of the circuit by the offset data table and the gain data table. The image adjusting apparatus further adjusts the offset value of the image by the offset module, and adjusts the gain value of the image by the gain module. Therefore, the image adjusting apparatus of the invention can raise the adjusting efficiency and accuracy to ensure the display quality.

When adjusting the image, the offset module and the gain module are in OFF situation. After inputting the test image, the offset value and the gain value of the circuit is calculated by the operation module and the calculation formulas. Then, the offset value and the gain value are stored in the offset data table and the gain data table. Finally, the offset module and the gain module are opened, and hence the input signals can be inputted by the video interface. Therefore, the image starts to be adjusted.

Therefore, the image adjusting apparatus and the method thereof utilizes the design circuits, the test image and the co-operated computations to confirm the gray level of the image. Furthermore, each of the circuits is repeatedly adjusted by computer control during a second to confirm the gray level directly. Comparing with the conventional art, the image adjusting apparatus and the method thereof according to the invention is more accurate and swifter, so as to enhance the speed and the accuracy of the image adjustment.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image adjusting method for receiving a set of input signals comprising a test image transmitted from a video interface, which is used for receiving a plurality of sets of input signals, said image adjusting method being further used for automatically adjusting the set of input signals to generate a set of output signals, said method comprising the steps of:

(a) generating a plurality of adjusting signals, according to a first original gray level value Gl, a second original gray level value Gh, a first changed gray level value gl, and a second changed gray level value gh, wherein the test image comprises a first region and a second region, the first region has the first original gray level value Gl and the second region has the second original gray level value Gh before the test image is transmitted via the video interface; the first region has the first changed gray level value gl and the second region has the second changed gray level value gh after the test image is transmitted via the video interface;

(b) storing the plurality of adjusting signals;

(c) according to the plurality of adjusting signals, transforming the set of input signals into a set of temporary signals; and (d) according to the plurality of adjusting signals, transforming the set of temporary signals into a set of output signals;

wherein the set of input signals is adjusted by the following formulas:

$$\text{Gray Level}' = \left[\text{Gray Level} - \text{Offset3} - Gl\left(1 - \frac{1}{\text{Gain}}\right)\right] \times \text{Gain},$$

$$\text{Gain} = \frac{Gh - Gl}{gh - gl},$$

wherein "Gray level'" represents an original gray level value of one of the input signals, "Gray level" represents an adjusted gray level value of one of the output signals, and Offset3 represents that the first changed gray level value gl minus the first original gray level value Gl.

2. The method of claim 1, wherein step (a) comprises the steps of:
(a1) transforming the test image into a histogram; and
(a2) generating the plurality of adjusting signals in accordance with the gray level distribution of the histogram.

3. The method of claim 2, wherein the plurality of adjusting signals comprise a plurality of offset signals and a plurality of gain signals.

4. The method of claim 3, wherein the plurality of offset signals are stored in an offset data table, and the plurality of gain signals are stored in a gain data table.

5. The method of claim 4, wherein in step (c), the set of input signals is transformed into the set of temporary signals according to the plurality of offset signals stored in the offset data table.

6. The method of claim 4, wherein in step (d), the set of temporary signals is transformed into the set of output signals in accordance with the plurality of gain signals stored in the gain data table.

7. An image adjusting method for receiving a set of input signals comprising a test image transmitted from a video interface used to receive a plurality of sets of input signals, said image adjusting method being further used for automatically adjusting to generate a set of output signals, said method comprising the steps of:

(a) generating a plurality of adjusting signals, according to a first original gray level value Gl, a second original gray level value Gh, a first changed gray level value gl, and a second changed gray level value gh, wherein the test image comprises a first region and a second region, the first region has the first original gray level value Gl and the second region has the second original gray level value Gh before the test image is transmitted via the video interface; the first region has a first changed gray level value gl and the second region has a second changed gray level value gh after the test image is transmitted via the video interface;

(b) storing the plurality of adjusting signals;

(c) according to the plurality of adjusting signals, transforming the set of input signals into a set of first temporary signals;

(d) according to the plurality of adjusting signals, transforming the set of first temporary signals into a set of second temporary signals; and (e) according to the plurality of adjusting signals, transforming the set of second temporary signals into the set of output signals;

wherein the set of input signals is adjusted by the following formulas:

$$\text{Gray Level}' = (\text{Gray Level} - \text{Offset2}) \times \text{Gain} + \text{Offset1},$$

$$\text{Gain} = \frac{Gh - Gl}{gh - gl},$$

wherein "Gray level'" represents an original gray level value of one of the input signals, "Gray level" represents an adjusted gray level value of one of the output signals, Offset2 represents the first changed gray level value gl, and Offset1 represents the first original gray level value Gl.

8. The method of claim 7, wherein step (a) comprises the steps of:
(a1) transforming the test image into an histogram; and
(a2) generating the plurality of adjusting signals in accordance with the gray level distribution of the histogram.

9. The method of claim 8, wherein the plurality of adjusting signals comprise a plurality of first offset signals, a plurality of second offset signals and a plurality of gain signals.

10. The method of claim 9, wherein the plurality of first offset signals are stored in a first offset data table, the plurality of second offset signals are stored in a second offset data table, and the plurality of gain signals are stored in a gain data table.

11. The method of claim 10, wherein in step (c), the set of input signals is transformed into the set of first temporary signals in accordance with the plurality of first offset signals stored in the first offset data table.

12. The method of claim 10, wherein in step (d), the set of first temporary signals is transformed into the set of second temporary signals in accordance with the plurality of gain signals stored in the gain data table.

13. The method of claim 10, wherein in step (d), the set of second temporary signals is transformed into the set of output signals in accordance with the plurality of second offset signals stored in the second offset data table.

* * * * *